United States Patent [19]

Suzuki

[11] Patent Number: 4,533,923

[45] Date of Patent: Aug. 6, 1985

[54] INK-JET RECORDING METHOD

[75] Inventor: Eiichi Suzuki, Tokyo, Japan

[73] Assignee: Canon Kabushiki Kaisha, Tokyo, Japan

[21] Appl. No.: 612,701

[22] Filed: May 21, 1984

[30] Foreign Application Priority Data

May 24, 1983 [JP] Japan .................. 58-89932

[51] Int. Cl.³ ............... G01D 15/18; C09D 11/02
[52] U.S. Cl. ................ 346/1.1; 346/140 R; 106/22
[58] Field of Search ........ 346/140 R, 140 IJ, 140 PD; 106/22; 523/160

[56] References Cited

U.S. PATENT DOCUMENTS

| | | | |
|---|---|---|---|
| 3,889,271 | 6/1975 | Freytag et al. | 346/140 IJ X |
| 3,994,736 | 11/1976 | Hertz et al. | 346/140 IJ X |
| 4,153,593 | 5/1979 | Zabiak et al. | 106/22 X |
| 4,176,361 | 11/1979 | Kawada et al. | 346/140 IJ X |
| 4,177,075 | 12/1979 | Mansukhani | 106/22 X |
| 4,361,843 | 11/1982 | Cooke et al. | 106/22 X |
| 4,390,369 | 6/1983 | Merritt et al. | 346/140 PD UX |
| 4,399,443 | 8/1983 | Yasufuku et al. | 106/22 X |
| 4,492,968 | 1/1985 | Lee et al. | 346/140 PD |

*Primary Examiner*—George H. Miller, Jr.
*Attorney, Agent, or Firm*—Fitzpatrick, Cella, Harper & Scinto

[57] ABSTRACT

An ink-jet recording method in which inks of one or more colors and for each color a plurality of inks different in dye concentration are employed, which is characterized in that the maximum value ($V_{max}$) of the viscosities of the inks of each color and the minimum value ($V_{min}$) thereof satisfy the relation $$0.8 \leq V_{min}/V_{max}.$$

3 Claims, No Drawings

INK-JET RECORDING METHOD

BACKGROUND OF THE INVENTION

1. Field of the Invention

The present invention relates to ink-jet recording method that comprises adhering flying ink (recording liquid) droplets onto recording media, thereby forming color images. More particularly, the invention relates to an ink-jet recording method for recording full-color images with a wide range of reproducibility of colors and with good gradation.

2. Description of the Prior Art

Ink-jet recording method comprises (i) producing ink droplets by a technique for discharging inks, such as the electrostatic attraction technique based on the application of high voltage, the technique of causing mechanical vibration or displacement of the ink by means of piezoelectric elements, or the technique of heating the ink to foam instantaneously and utilizing the foaming pressure, and (ii) causing the ink droplets to adhere to recording media such as paper. This recording method is noticed in that it generates limited noises and permits high speed recording.

When color images delicate in shade or tinct like those in silver salt photographs are formed by ink-jet recording, the density gradations of various colors in the images are expressed in the conventional ink-jet recording by using inks of colors, e.g. cyan, magenta, yellow and black and by controlling the diameter and number (per unit area) of the ink dots to be formed on recording media for color mixing according to the densities of three primary color components in the original images to be recorded.

However, according to this method of recording with varying the diameter and number of ink dots, it is impossible to express such gradations that image density gradually varies over the entire area of from the lowest to the highest density according to original images, resulting in low resolution images or unnatural images.

Various ink-jet recording techniques have been proposed to solve these problems. Among these, techniques of recording by use of at least two inks of different dye concentrations for each color are known from Japanese Laid-Open Patent Application No. 156264/82 and other literature.

In particular, the ink-jet recording technique disclosed in the above patent is characterized in that a plurality of inks of different dye concentrations are used for each of colors, the diameter and number of the ink dots to be formed are varied according to the density levels in the original image, and at the same time dots of one of the inks of lower dye concentration are printed over almost the entire range of from low to high density of the image to be recorded. According to this technique, the density gradations of each color can be better expressed, particularly on lower image density areas, than according to the conventional technique.

In such recording techniques, however, ink properties such as viscosity, surface tension, and pH are considerably varied from ink to ink with the difference of dye concentration among plural inks, since the inks of the same color and of different dye concentrations are prepared by dissolving a dye in different concentrations in the same composition of solvents. In particular, the viscosity variation among the plural inks used causes significant variation in the intended diameter of the resulting ink dots and large deviation between the point where each ink droplet hits and the target point on recording media. This is a cause of great difficulty in recording high quality images with high resolution and natural feeling.

SUMMARY OF THE INVENTION

The primary object of the invention is to provide an ink-jet recording method which solves the above noted problems.

Accordingly, an object of the invention is to provide an ink-jet recording method for recording high quality images in which color density varies gradually and smoothly over a wide range.

A particular object of the invention is to provide an ink-jet recording method for reproducing high quality images wherein ink droplets hit the target points accurately and form ink dots of intended diameters, without being affected by the difference of dye concentration among inks.

These and other objects of the invention are achieved with an ink-jet recording method in which inks of one or more colors and for each color a plurality of inks different in dye concentration are employed, characterized in that the maximum value ($V_{max}$) of the viscosities of the inks of each color and the minimum value ($V_{min}$) thereof satisfy the relation of $$0.8 \leq V_{min}/V_{max}.$$

DETAILED DESCRIPTION OF THE INVENTION

In the ink-jet recording method of this invention, inks of a desired color and used for monochromatic images and inks of usually 3–4 different primary colors (e.g. cyan, magenta, yellow, and black) are used for multi-color images. In both cases, the diameter and number (per unit area) of ink dots are controlled corresponding to the color of original images.

Any of the inks used in the method of the invention is composed of a dye as a coloring component and water, a dye, water and a water soluble solvent.

Dyes for the coloring component can be selected from those generally used for ink-jet recording inks. In the method of the invention, a plurality of inks different in dye concentration are used for each color to exhibit image density gradations varying continuously and smoothly over a wide range. These plural inks can be prepared by dissolving dyes in different concentrations, and for each color, are desirably prepared by dissolving a dye in different concentrations ranging from 0.1 to 4% by weight. Preferably, a dye is used in three or more different concentrations of about 0.3%, 0.7%, 3.0%, and so forth, by weight for each color.

Viscosities of the inks used in the method of this invention can be adjusted to be within a definite intended range chiefly by varying the proportions of water-miscible solvents in the individual inks depending upon the dye concentrations therein. The definite intended range means that, when viscosities of plural inks having the same color and different dye concentrations lie in this range, practically no variation is observed in the diameter of the dots formed from these inks under the same conditions. In the invention, the viscosities of such plural inks lying in this range satisfy the relation of $0.8 \leq V_{min}/V_{max}$, preferably $0.85 \leq V_{min}/V_{max}$, wherein $V_{min}$ is the minimum value of these viscosities and $V_{max}$ is the maximum value thereof. As shown in the comparative examples which will be given later, the ratio ($V_{min}/V_{max}$) is generally about 0.7 when the inks are prepared by using the same solvents in the same proportion and varying the dye concentration. In such a case, the quality of the resulting images is impaired, since the intended diameter of the ink dots formed from these inks varies and the points where droplets of these inks hit deviate from the respective target points.

The water-miscible solvents serving as solvent components for dissolving the dye are also utilized for adjusting the viscosity of the ink by varying the proportions thereof with the dye concentration and further act as wetting agents for preventing the clogging of the discharge orifice. Such water-miscible solvents include; $C_1$-$C_4$ alkyl alcohols, e.g. methanol, ethanol, n-propanol, isopropanol, n-butanol, sec-butanol, tert-butanol, and isobutanol; amides, e.g. dimethylformamide and dimethylacetamide; ketones or ketone alcohols, e.g. acetone and diacetone alcohol; ethers, e.g. tetrahydrofuran and dioxane; nitrogen-containing heterocyclic ketones, e.g. N-methyl-2-pyrrolidone and 1,3-dimethyl-2-imidazolidione; polyalkylene glycols, e.g. polyethylene glycol and polypropylene glycol; alkylene glycols containing $C_2$-$C_6$ alkylene, e.g. ethylene glycol, propylene glycol, butylene glycol, triethylene glycol, 1,2,6-hexanetriol, thiodiglycol, hexylene glycol, and diethylene glycol; glycerol; and lower alkyl ethers of polyhydric alcohols, e.g. ethylene glycol methyl ether, diethylene glycol methyl (or ethyl) ether, and triethylene glycol monomethyl (or monoethyl) ether.

Of these water-miscible organic solvents, preferred are diethylene glycol, triethylene glycol monomethyl ether, and triethylene glycol monoethyl ether.

The total concentration of water-miscible organic solvents in each ink is in the range of generally from 5 to 95%, preferably from 10 to 80%, particularly preferably from 20 to 50%, by weight based on the total weight of the ink.

For adjusting viscosities of inks, the total concentrations of water-miscible solvents in the individual ink may be fixed or varied from one another.

Viscosity adjustment for a series of inks, while possible by varying the composition of water-miscible solvents therein depending upon the dye content as stated above, can be accomplished also by adding to each ink a viscosity regulator selected from poly(vinyl alcohol), cellulose derivates, and other water-soluble resins.

Inks, used in the method of this invention, prepared from the components stated above are superior and well-balanced, as such, in recording characteristics (signal responsiveness, droplet formation stability, discharge stability, long-term continued recording property, and discharge stability after a long period of stoppage), storage stability, solution stability of coloring components, fixability onto recording media, and light resistance, weather resistance, water resistance, and alcohol resistance, of recorded images. For the purpose of further enhancing some of the properties, such as recording characteristics, storage stability, and fixability onto recording media, various additives such as a surfactant, pH regulator, and resistivity regulator may be added to the inks as required.

According to the ink-jet recording method of this invention, wherein inks are prepared from the components stated above, recording can be accomplished without practical variation in the intended diameter of ink dots or appreciable deviation between the point where each ink droplet hits and the target point, by bringing close together the viscosities of the inks having the same color and different dye concentrations; in addition, it is possible to express gradations of image density varying continuously and smoothly, since the plurality of inks of the same color different in dye concentration to large extents can be successfully used; particularly when original color images delicate in shade or tinct are reproduced by using inks of one or more colors, high quality images with natural feeling can be recorded.

The invention is illustrated in more detail with reference to the following examples and comparative examples.

EXAMPLE 1

Inks of six different dye concentrations having the same color were prepared as follows. A dye C.I. Direct Blue-86 was added into solvents of the compositions shown in Table 1 to concentrations of 0.1, 0.3, 0.7, 1.0, 2.0, and 4.0% by weight based on the total weight of the resulting ink respectively. The mixtures were each stirred until the dye dissolved almost completely, and were filtered with pressure through 1.0-$\mu$ pore size filters (supplied by Sumitomo Denko Co., Ltd. under the tradename Fluoro Pore Filter) to separate the filtrates as inks.

As shown in Table 1, the concentrations of water-miscible solvents ethylene glycol and polyethylene glycol were varied depending upon the dye concentrations within a proper range so that the combined concentration of both solvents would become 30 wt.% based on the total weight of the solvents and the additives.

TABLE 1

| Components of ink | | Composition of ink (wt. %) | | | | | |
|---|---|---|---|---|---|---|---|
| | C.I. Direct | 0.1 | 0.3 | 0.7 | 1.0 | 2.0 | 4.0 |
| Dye | Blue-86 | | | | | | |
| Solvent | Water | 52.9 | 52.9 | 52.9 | 52.9 | 52.9 | 52.9 |
| | Ethylene glycol | 13.5 | 14.3 | 14.7 | 15.0 | 16.0 | 17.0 |
| | Polyethylene glycol | 16.5 | 15.7 | 15.3 | 15.0 | 14.0 | 13.0 |
| | N—Methyl-2-pyrrolidone | 15.0 | 15.0 | 15.0 | 15.0 | 15.0 | 15.0 |
| Additive | Urea | 2.0 | 2.0 | 2.0 | 2.0 | 2.0 | 2.0 |
| | Emal NC* | 0.1 | 0.1 | 0.1 | 0.1 | 0.1 | 0.1 |

*Trade name, a surfactant supplied by Kao Soap Co., Ltd.

Viscosities of the prepared inks were measured at 25° C. by means of an E-type rotation viscometer. The found viscosities are shown in Table 2. From these results, the ratio ($V_{min}/V_{max}$), which is a measure of the range of viscosity distribution, was obtained. As shown later in Table 13, the ratio ($V_{min}/V_{max}$) of this series of inks was 0.87, indicating that the viscosities of these inks were distributed in a very narrow range.

Using these inks, ink-jet recording was conducted under the following conditions. Diameters of the resulting ink dots were measured with a microscope. The found diameters of the ink dots were almost even as shown in Table 2, and the deviations of the points where ink droplets hitted were scarcely observed.

Recording conditions:
Diameter of discharging orifice: 65 $\mu$m
Driving conditions of piezo oscillator: 65 V, 10 $\mu$sec.
Response frequency: 2 KHz
Recording paper: Mitusbishi Ink-Jet Recording Paper M (supplied by Mitsubishi Seishi Co., Ltd.)

TABLE 2

| Dye concentration (wt. %) | Viscosity (cp) | Diameter of ink dot (μm) |
|---|---|---|
| 0.1 | 4.92 | 195.0 |
| 0.3 | 4.97 | 190.0 |
| 0.7 | 5.03 | 187.5 |
| 1.0 | 5.13 | 186.5 |
| 2.0 | 5.28 | 186.0 |
| 4.0 | 5.60 | 184.0 |

EXAMPLE 2

Using a dye C.I. Direct Yellow-100, inks of six different dye concentrations were prepared in the same manner as in Example 1. The viscosity was adjusted by varying the concentrations of water-miscible solvents diethylene glycol and polyethylene glycol depending upon the dye concentrations in the inks, as shown in Table 3.

TABLE 3

| Components of ink | | Compositions of ink (wt. %) | | | | | |
|---|---|---|---|---|---|---|---|
| Dye | C.I. Direct Yellow-100 | 0.1 | 0.3 | 0.7 | 1.0 | 2.0 | 4.0 |
| Solvent | Water | 52.9 | 52.9 | 52.9 | 52.9 | 52.9 | 52.9 |
| | Diethylene glycol | 13.5 | 14.3 | 14.7 | 15.0 | 16.0 | 17.5 |
| | Polyethylene glycol | 16.5 | 15.7 | 15.3 | 15.0 | 14.0 | 12.5 |
| | N—Methyl-2-pyrrolidone | 15.0 | 15.0 | 15.0 | 15.0 | 15.0 | 15.0 |
| Additive | Triethanol-amine | 2.0 | 2.0 | 2.0 | 2.0 | 2.0 | 2.0 |
| | Emal NC | 0.2 | 0.2 | 0.2 | 0.2 | 0.2 | 0.2 |

Viscosities of the prepared inks were measured at 25° C. by using an E-type rotation viscometer. The found viscosities are shown in Table 4. The ratio ($V_{min}/V_{max}$) obtained from these results was 0.94 as shown in Table 13. Thus, little variation was observed in the viscosities of this series of inks.

Using these inks, ink-jet recording was conducted in the same manner as in Example 1, and diameters of the resulting ink dots were measured with a microscope. The found diameters of the ink dots formed from these inks were almost even as shown in Table 4, and the deviations of the points where ink droplets hitted were scarcely observed.

TABLE 4

| Dye concentration (wt. %) | Viscosity (cp) | Diameter of ink dot (μm) |
|---|---|---|
| 0.1 | 5.30 | 198.0 |
| 0.3 | 5.38 | 193.5 |
| 0.7 | 5.39 | 191.0 |
| 1.0 | 5.41 | 190.5 |
| 2.0 | 5.50 | 190.0 |
| 4.0 | 5.60 | 189.5 |

EXAMPLE 3

Using a dye C.I. Direct Blue-199, inks of six different dye concentrations were prepared in the same manner as in Example 1. The compositions of the prepared inks are shown in Table 5.

TABLE 5

| Components of ink | | Composition of ink (wt. %) | | | | | |
|---|---|---|---|---|---|---|---|
| Dye | C.I. Direct Blue-199 | 0.1 | 0.3 | 0.7 | 1.0 | 2.0 | 4.0 |
| Solvent | Water | 59.9 | 59.9 | 59.9 | 59.9 | 59.9 | 59.9 |
| | Diethylene glycol | 32.0 | 31.5 | 31.0 | 30.0 | 29.0 | 28.0 |
| | N—Methyl-2-pyrrolidone | 6.0 | 6.5 | 7.0 | 8.0 | 9.0 | 10.0 |
| Additive | Urea | 2.0 | 2.0 | 2.0 | 2.0 | 2.0 | 2.0 |
| | Emal NC | 0.1 | 0.1 | 0.1 | 0.1 | 0.1 | 0.1 |

Viscosities of the prepared inks were measured at 25° C. by using an E-type rotation viscometer. The found viscosities are shown in Table 6. The ratio ($V_{min}/V_{max}$) obtained from these results was 0.94 as shown in Table 13. Thus, little variation was observed in the viscosities of this series of inks.

Using these inks, ink-jet recording was conducted in the same manner as in Example 1, and diameters of the resulting ink dots were measured with a microscope. The found diameters of the ink dots formed from these inks were almost even as shown in Table 6, and the deviations of the points where ink droplets hitted were scarcely observed.

TABLE 6

| Dye concentration (wt. %) | Viscosity (cp) | Diameter of ink dot (μm) |
|---|---|---|
| 0.1 | 3.28 | 237.5 |
| 0.3 | 3.34 | 226.0 |
| 0.7 | 3.38 | 223.5 |
| 1.0 | 3.43 | 221.0 |
| 2.0 | 3.52 | 217.0 |
| 4.0 | 3.81 | 215.0 |

COMPARATIVE EXAMPLE 1

Inks of six different dye concentrations and of the compositions shown in Table 7 were prepared in the same manner and using the same components as in Example 1. In this case, the concentrations of the solvent components in the medium of each ink were kept fixed throughout all of these inks.

TABLE 7

| Components of ink | | Composition of ink (wt. %) | | | | | |
|---|---|---|---|---|---|---|---|
| Dye | C.I. Direct Blue-86 | 0.1 | 0.3 | 0.7 | 1.0 | 2.0 | 4.0 |
| Solvent | Water | | | 52.9 | | | |
| | Ethylene glycol | | | 15.0 | | | |
| | Polyethylene glycol | | | 15.0 | | | |
| | N—Methyl-2-pyrrolidone | | | 15.0 | | | |
| Additive | Urea | | | 2.0 | | | |
| | Emal NC | | | 0.1 | | | |

Viscosities of the thus prepared inks were measured at 25° C. with an E-type rotation viscometer. The found viscosities are shown in Table 8. The ratio ($V_{min}/V_{max}$) determined from these results was 0.65 as shown in Table 13. Thus, large variation was observed in the viscosities of this series of inks.

Using these inks, ink-jet recording was conducted in the same manner as in Example 1, and diameters of the resulting ink dots were measured with a microscope. Results thereof are shown in Table 8.

TABLE 8

| Dye concentration (wt. %) | Viscosity (cp) | Diameter of ink dot (μm) |
| --- | --- | --- |
| 0.1 | 4.11 | 210.0 |
| 0.3 | 4.30 | 207.0 |
| 0.7 | 4.62 | 204.0 |
| 1.0 | 5.06 | 199.5 |
| 2.0 | 5.37 | 192.0 |
| 4.0 | 6.40 | 181.5 |

As shown in Table 8, significant variation was observed in the diameters of the ink dots, some of which were deformed. Moreover, considerable deviation was found between the points where each ink droplet hitted and the target point.

COMPARATIVE EXAMPLE 2

Inks of six different dye concentrations and of the compositions shown in Table 9 were prepared in the same manner as in Example 1, by using the same components as in Example 2. In this case, the concentrations of all the solvent components in the medium of each ink were kept fixed throughout all of these inks.

TABLE 9

| Components of ink | | Composition of ink (wt. %) | | | | | |
| --- | --- | --- | --- | --- | --- | --- | --- |
| Dye | C.I. Direct Yellow-100 | 0.1 | 0.3 | 0.7 | 1.0 | 2.0 | 4.0 |
| Solvent | Water | 52.9 | | | | | |
| | Diethylene glycol | 15.0 | | | | | |
| | Polyethylene glycol | 15.0 | | | | | |
| | N—Methyl-2-pyrrolidone | 15.0 | | | | | |
| Additive | Triethanolamine | 2.0 | | | | | |
| | Emal NC | 0.1 | | | | | |

Viscosities of the thus prepared inks were measured at 25° C. with an E-type rotation viscometer. The found viscosities are shown in Table 10. The ratio ($V_{min}/V_{max}$) obtained from these results was 0.71 as shown in Table 13. Thus, large variation was observed in the viscosities of this series of inks.

Using these inks, ink-jet recording was conducted in the same manner as in Example 1, and diameters of the resulting ink dots were measured with a microscope. Results thereof are shown in Table 10.

TABLE 10

| Dye concentration (wt. %) | Viscosity (cp) | Diameter of ink dot (μm) |
| --- | --- | --- |
| 0.1 | 4.50 | 220.6 |
| 0.3 | 4.57 | 196.0 |
| 0.7 | 4.90 | 190.0 |
| 1.0 | 5.37 | 187.5 |
| 2.0 | 5.78 | 184.5 |
| 4.0 | 6.30 | 181.0 |

As shown in Table 10, significant variation was caused in the diameters of the ink dots, some of which were deformed. Moreover, considerable deviation was found between the point where each ink droplet hitted and the target point.

COMPARATIVE EXAMPLE 3

Inks of six different dye concentrations and of the composition shown in Table 11 were prepared in the same manner as in Example 1, by using the same components as in Example 3. In this case, the concentrations of all the solvent components in the medium of each ink were kept fixed throughout all of these inks.

TABLE 11

| Components of ink | | Composition of ink (wt. %) | | | | | |
| --- | --- | --- | --- | --- | --- | --- | --- |
| Dye | C.I. Direct Blue-199 | 0.1 | 0.3 | 0.7 | 1.0 | 2.0 | 4.0 |
| Solvent | Water | 59.9 | | | | | |
| | Diethylene glycol | 29.0 | | | | | |
| | N—Methyl-2-pyrrolidone | 9.0 | | | | | |
| Additive | Urea | 2.0 | | | | | |
| | Emal NC | 0.1 | | | | | |

Viscosities of the thus prepared inks were measured at 25° C. with an E-type rotation viscometer. The found viscosities are shown in Table 12. The ratio ($V_{min}/V_{max}$) obtained from these results was 0.68 as shown in Table 13. Thus, large variation was observed in the viscosities of this series of inks.

Using these inks, ink-jet recording was conducted in the same manner as in Example 1, and diameters of the resulting ink dots were measured with a microscope. Results thereof are shown in Table 12.

TABLE 12

| Dye concentration (wt. %) | Viscosity (cp) | Diameter of ink dot (μm) |
| --- | --- | --- |
| 0.1 | 3.01 | 240.1 |
| 0.3 | 3.05 | 240.6 |
| 0.7 | 3.20 | 238.2 |
| 1.0 | 3.28 | 237.5 |
| 2.0 | 3.67 | 216.3 |
| 4.0 | 4.40 | 200.7 |

As shown in Table 12, significant variation was caused in the diameters of the ink dots, some of which were deformed. Moreover, considerable deviation was found between the point where each ink droplet hitted and the target point.

Results of the above examples and comparative examples are summarized in Table 13.

TABLE 13

| | $\dfrac{V_{min}}{V_{max}}$ | Diameter of ink dot (μm) | |
| --- | --- | --- | --- |
| | | min. | max. |
| Example 1 | 0.87 | 184.0 | 195.0 |
| Example 2 | 0.94 | 189.5 | 198.0 |
| Example 3 | 0.94 | 215.0 | 237.5 |
| Comparative Example 1 | 0.65 | 181.5 | 210.0 |
| Comparative Example 2 | 0.71 | 181.0 | 220.6 |
| Comparative Example 3 | 0.68 | 200.7 | 240.1 |

As shown in Table 13, the viscosity distribution of a series of inks having the same color and different dye concentrations, in the examples according to the method of this invention, satisfies the relation of $0.8 \leq V_{min}/V_{max}$ regardless of the level of these viscosities, and the ink dots marked with these inks are almost even in size and shape, while the ratio ($V_{min}/V_{max}$) in the comparative examples is of the order of 0.65–0.71 and the ink dots are far from uniform and include deformed ones.

What I claim is:

1. An ink-jet recording method in which inks of one or more colors and for each color a plurality of inks of different dye concentrations are employed, characterized in that maximum value (Vmax) of the viscosities of the inks of each color and the minimum value (Vmin) thereof satisfy the relation $$0.8 \leq V\text{min}/V\text{max}.$$

2. The ink-jet recording method according to claim 1, in which said maximum value and said minimum value satisfy the relation $$0.85 \leq V\text{min}/V\text{max}.$$

3. The ink jet recording method according to claim 1, in which each of said inks comprises a mixture selected from the group consisting of a mixture of a dye and water, and a mixture of a dye, water and a water-soluble solvent.

* * * * *